United States Patent
Michaeli et al.

(10) Patent No.: US 11,820,473 B2
(45) Date of Patent: Nov. 21, 2023

(54) HULL THERMAL MANAGEMENT SYSTEM

(71) Applicant: Ockerman Automation Consulting, Inc., Anacortes, WA (US)

(72) Inventors: Jennifer Michaeli, Smithfield, VA (US); Robert Walling, Pine Beach, NJ (US); Alden Nelson, Norfolk, VA (US)

(73) Assignee: Ockerman Automation Consulting, Inc., Anacortes, WA (US)

( * ) Notice: Subject to any disclaimer, the term of this patent is extended or adjusted under 35 U.S.C. 154(b) by 794 days.

(21) Appl. No.: 16/803,846

(22) Filed: Feb. 27, 2020

(65) Prior Publication Data

US 2021/0269131 A1    Sep. 2, 2021

(51) Int. Cl.
| | |
|---|---|
| B63G 13/02 | (2006.01) |
| F25D 1/02 | (2006.01) |
| G05D 23/19 | (2006.01) |
| B63H 20/28 | (2006.01) |
| F01P 3/20 | (2006.01) |
| B63J 2/12 | (2006.01) |

(52) U.S. Cl.
CPC ............ B63G 13/02 (2013.01); F25D 1/02 (2013.01); G05D 23/1917 (2013.01); B63G 2013/027 (2013.01); B63H 20/28 (2013.01); B63J 2/12 (2013.01); F01P 3/207 (2013.01)

(58) Field of Classification Search
CPC ............. F01P 3/207; B63H 20/28; B63J 2/12
See application file for complete search history.

(56) References Cited

U.S. PATENT DOCUMENTS 3,283,734 A * 11/1966 Gorman ................. F17C 13/06
114/74 A 2002/0152942 A1    10/2002 Steller et al.
2006/0179861 A1 *  8/2006 Weber ....................... H01Q 1/34
62/240
2014/0054243 A1 *  2/2014 Hummer ................... C02F 1/02
261/76
2018/0273154 A1    9/2018 Villadsen et al.
2018/0355782 A1 * 12/2018 Angelle ................. B63H 20/28

FOREIGN PATENT DOCUMENTS

| CN | 103318391 A | 9/2013 |
|---|---|---|
| DE | 3634936 C1 | 5/1988 |
| DE | 3634936 C1 * | 5/1988 |

OTHER PUBLICATIONS

International Search Report and Written Opinion received in PCT/US2021/020077 dated Jul. 13, 2021.
Invitation to Pay Additional Fees received in PCT/US2021/020077 dated May 5, 2021.

* cited by examiner

Primary Examiner — Lionel Nouketcha
(74) Attorney, Agent, or Firm — Dorsey & Whitney LLP

(57) ABSTRACT

A system for controlling a thermal signature of a boat is disclosed. The system includes a fluid compartment adjacent to an external wall of the boat. The fluid compartment is disposed between a heat source in a hull cavity of the boat and the external wall of the boat such that heat energy released from the heat source is transferred to a fluid in the fluid compartment. A fluid mover moves a first volume of the fluid out of the fluid compartment and replaces at least a portion of the first volume with a second volume of fluid, wherein the second volume of fluid has a different temperature than the first volume of fluid before entering the fluid compartment.

22 Claims, 10 Drawing Sheets

HULL THERMAL MANAGEMENT SYSTEM

BACKGROUND

In marine vessels used in military and law enforcement operations, it may be advantageous for the marine vessels to have reduced observability, particularly when carrying out missions in hostile areas. Reduced observability can include methods and systems to reduce the thermal signature of vehicles, thereby making them less vulnerable to detection by thermal detection technology, such as infrared cameras or sensors.

BRIEF SUMMARY

Described here are examples of a system for controlling a thermal signature of a boat. The system includes a fluid compartment adjacent to an external wall (e.g., a hull, deck, or superstructure) of the boat. The fluid compartment is disposed between a heat source in a hull cavity of the boat and the external wall of the boat such that heat energy released from the heat source (e.g., an engine) is transferred to a fluid in the fluid compartment. A fluid mover moves a first volume of the fluid out of the fluid compartment and replaces at least a portion of the first volume with a second volume of fluid. The second volume of fluid has a different temperature than the first volume of fluid before entering the fluid compartment.

The fluid compartment may be defined between spaced-apart inner and outer hulls of the boat extending along at least a portion of the length of the boat, the inner hull defining the hull cavity of the boat. In some embodiments, the fluid compartment may be defined by a baffle, and the fluid compartment may be in fluid communication with the hull cavity.

In some embodiments, the fluid in the fluid compartment is liquid-tight and the fluid compartment is a liquid. The fluid compartment may be liquid-tight for selectively containing and flowing the liquid fluid within and out of the fluid compartment. For example, the fluid compartment may be a ballast tank where the fluid additionally serves as ballast fluid. In some embodiments, the fluid compartment is a fuel tank and the fluid is fuel. In some embodiments, the fluid in the fluid compartment is a gas (e.g., air), and the fluid compartment may be configured to selectively vent the gaseous fluid, responsive to operation of the fluid mover, into the internal cavity of the hull. In some embodiments, the fluid may be a refrigerant, a mixture of glycol and water, or water. The fluid may be at a pressure at, above, or below an ambient pressure. The fluid may be a saturated vapor-liquid mixture. A fluid compartment (e.g., ballast, fuel or other tank) may extend along a starboard or a port hull side of the boat.

In some embodiments, the system may include a heat exchanger. The fluid mover couples the first volume of the fluid to the heat exchanger, such that at least a portion of the heat energy of the first volume of fluid is transferred to a working fluid of the heat exchanger to cool the fluid before returning the cooled fluid as the second volume of fluid to the fluid compartment. The heat exchanger may be disposed adjacent to, or formed integrally with, the external wall. The heat exchanger may be located between an inner and outer hull of the boat, the inner hull defining the hull cavity of the boat. The heat exchanger may include a heat exchange surface that comprises a portion of the external wall. A portion of an external wall may be insulated. In some embodiments, a substantial portion of the heat exchange surface is below a waterline of the boat. The heat exchange surface may reject the first portion of the heat energy to a body of water on which the boat floats. The heat exchanger may be located in the hull cavity of the boat.

In some embodiments, the fluid compartment is a first fluid compartment located between the heat source and a first external side of the boat and includes a second fluid compartment adjacent to a second external side of the boat opposite the first side. The fluid mover may be configured to move fluid from either the first fluid compartment or the second fluid compartment out of the respective fluid compartment for replacing the fluid removed from the respective fluid compartment with cooler fluid. A heat exchanger may be in fluid communication with the first and second fluid compartments. The first and second compartments may be coupled to the heat exchanger via a conduit and the fluid mover may generate a fluid flow through the conduit. The system may include a first valve operable to control a flow of the fluid to or from the first fluid compartment, and a second valve operable to control a flow of the fluid to or from the second fluid compartment. The first fluid compartment may be located on a starboard side of the boat, and the second fluid compartment may be located on a port side of the boat. One of the fluid compartment or the second fluid compartment may be located fore of the other of the fluid compartment or the second fluid compartment.

Examples of a method of controlling a thermal signature of a boat are described herein. The method includes determining a set point temperature for a thermally-controlled portion of an external wall of the boat. The method includes determining, by a processing element, a temperature of the thermally-controlled portion, and comparing the temperature of the thermally-controlled portion to the set point to determine an error therebetween. The flow of fluid to a fluid compartment in thermal communication with the thermally-controlled portion may be controlled. Such control may be proportional to, or use integrals or derivatives of, the error.

In another embodiment of a thermal signature control system, the system includes a first fluid compartment adjacent to an external wall of the boat and configured to store a fluid. A heat source is disposed within a hull cavity of the boat and configured to reject heat into the hull cavity. The first fluid compartment is disposed between the heat source and the external wall of the boat. A first fluid mover is configured to remove a first volume of the fluid from the first fluid compartment and to replace the first volume of the fluid with a second volume of fluid at a lower temperature than a temperature of the first volume of the fluid such that a thermal signature of the external wall is controlled. In some embodiments, the first fluid mover discharges the first volume of the fluid into the environment surrounding the boat and draws the second volume of fluid into the boat from the environment. In some embodiments, the fluid is a liquid and the first fluid mover is configured to move the liquid. The first fluid compartment is configured to hold the liquid with a liquid-tight seal. The system may further include a second fluid compartment defined by a baffle and disposed between the heat source and the first fluid compartment. A second fluid mover may be configured to remove a first volume of a gas from the hull cavity and replace the first volume of gas with a second volume of gas drawn into the hull cavity via the second fluid compartment. The second volume of gas may be at a lower temperature than a temperature of the first volume of gas.

DETAILED DESCRIPTION

Thermal signature reduction is a design consideration for many military vessels, in particular for craft that carry out stealth-related missions. Such vessels are powered by prime movers that generate heat. "Prime movers" refers to any device or system that converts energy from one form to another, for example, internal combustion engines (e.g., Otto, Diesel, or Atkinson cycle engines); external combustion engines (e.g., Stirling, Rankine, or steam engines or turbines); nuclear reactors; primary or secondary battery systems; gas turbines or jet engines (e.g., Brayton cycle engines); AC/DC electrical converters; transformers, DC/DC electrical converters; associated equipment; or the like, whether used for propulsion, auxiliary power, electricity generation, or other similar purposes. Such vessels may have other heat sources, such as electronic systems, weapons systems, vehicles, animals, or crew whose thermal signatures may contribute to the overall thermal signature of a vessel.

Vessels may have a cavity in the hull such as an internal machinery space, or engine compartment 112 that houses prime movers, other combustion machinery, or heat generating equipment that contribute to the heat signature of a vessel. Heat rejected from the prime movers typically results in higher hull temperatures local to the engine compartment 112, subsequently increasing the thermal signature in these areas.

Figure 1:
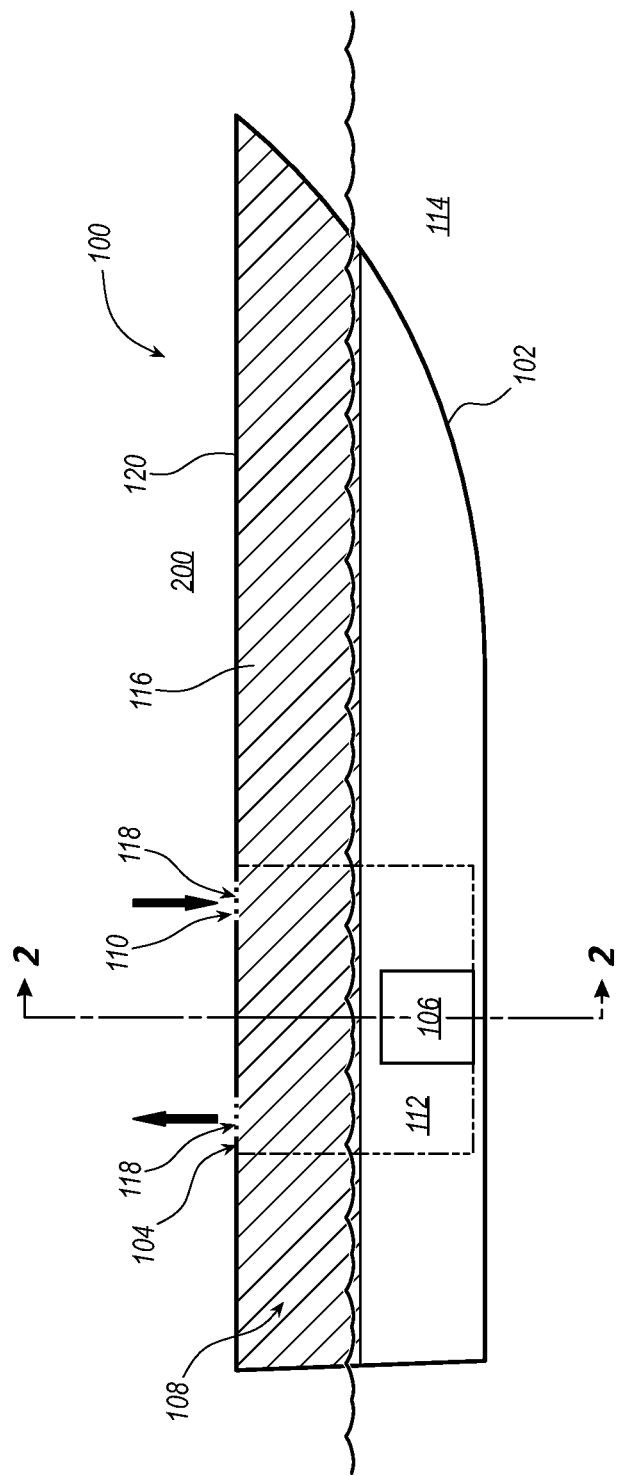
FIG. 1 illustrates a boat including a thermal signature control system in accordance with one embodiment.

FIG. 1 illustrates an embodiment of a boat 100 with a thermal signature control system 200. The boat 100 includes a compartment (e.g., an engine compartment 112) that houses a heat load or source 106 (e.g., an engine of the boat 100). The thermal signature control system 200 includes a fluid compartment 108 located along a portion of the external wall of the boat 100. In the present example, a fluid compartment 108 is located along a portion of the hull 102 providing a thermally-controlled portion 116 of the hull 102, however in other embodiments, the fluid compartment 108 could be located along a portion of a deck or superstructure of the boat. The fluid compartment 108 in this example controls the thermal signature of the thermally-controlled portion 116 of the hull 102. In other examples, a fluid compartment 108 may be arranged to control the thermal signature of another external wall of the boat, such as that of a deck 120 of the boat 100. In the example shown, the fluid lower end of the fluid compartment extends to approximately the water line of the boat 100. The water line can be above, at, or below a lower end of a fluid compartment, either in various embodiments of thermal signature control systems, or at various draughts of the boat 100 for any given embodiment of a thermal signature control system. For example, as the boat 100 rises higher in the water, such as due to less ballast, cargo, planing under propulsion, or the like, the lower end of the fluid compartment may rise above the water line. Likewise, as the boat 100 rides lower in the water, such as due to increased ballast, cargo, coming off plane as lower speeds, or the like, the lower end of the fluid compartment may sink to or below the water line.

In some embodiments, to facilitate combustion and or provide cooling air to the one or more prime movers or other heat sources 106 on the boat 100, one or more openings through the hull 102, such as an air intake 110 and/or air exhaust 104, may be provided to be in fluid communication with the engine compartment 112. The air intake 110 and air exhaust 104 may be provided as ducts or plenums and may optionally be covered by grating 118 or similar suitable structures.

Figure 2A:
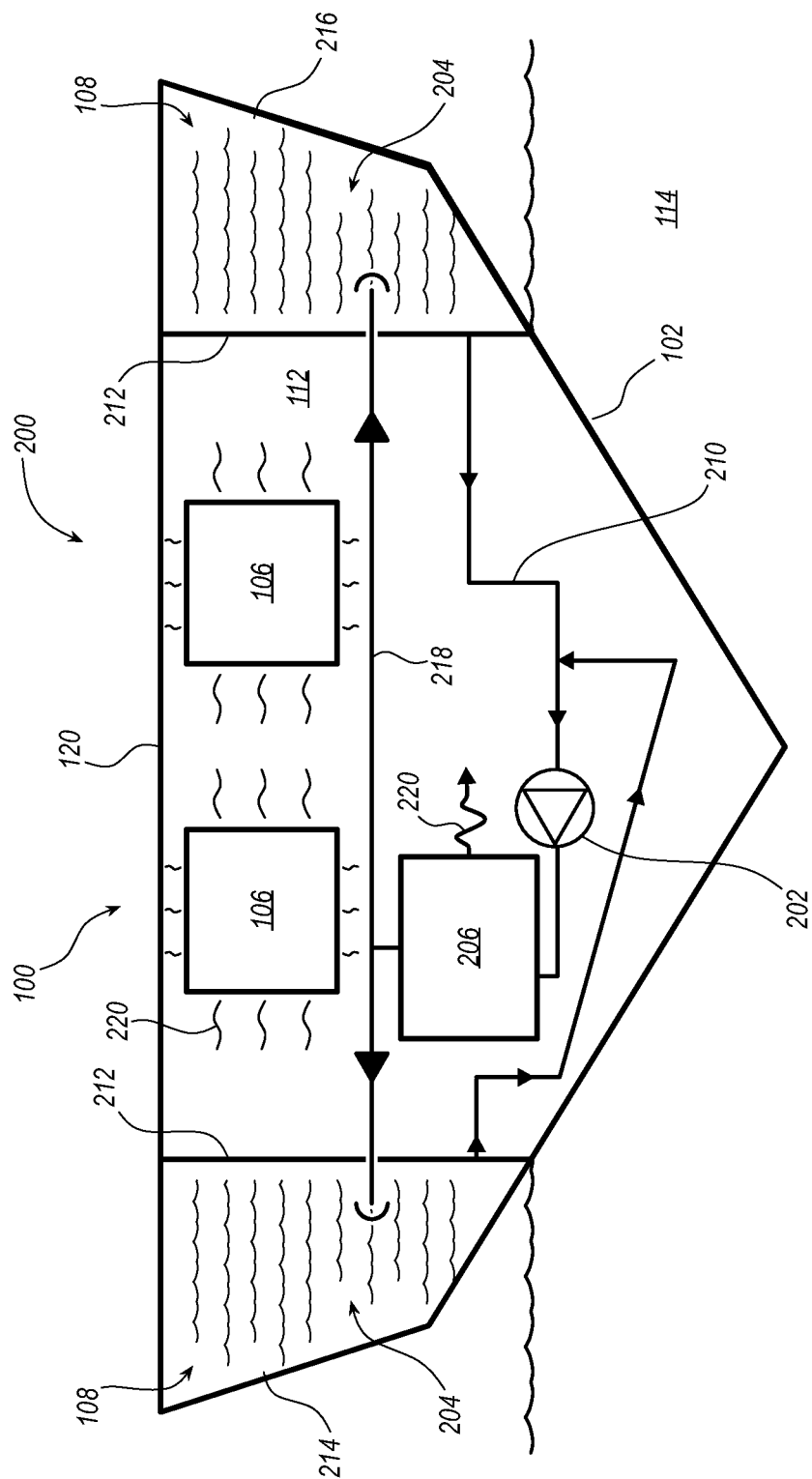
FIG. 2A illustrates a cross section of a boat, taken along section line 2-2 of FIG. 1 in accordance with one embodiment.

As shown in the cross section in FIG. 2A, the engine compartment 112 of the boat 100, which may be located below the deck 120 of the boat 100, includes one or more heat sources 106. In some embodiments of a thermal signature control system, one or more fluid compartments 108 are provided between an external wall of the boat and an internal heat source (e.g., a heat source in the engine compartment). In the example in FIG. 2A, fluid compartments 108 are provided between the heat source(s) 106 and the external wall (e.g., hull 102) in thermal communication with an external wall or hull 102 of the boat 100, on both the port side 214 and starboard side 216 of the boat 100. The fluid compartments 108 are also in thermal communication with internal walls or bulkheads 212 of the boat 100 that face or form part of the engine compartment 112. In some embodiments, the thermal signature control system 200 may utilize one or more fluid tanks of the boats such as fuel and/or ballast tanks as the one or more fluid compartments 108 of the thermal signature control system 200. In other words, the boat's fluid ballast or fuel tanks may serve the dual purpose of storing fuel and/or ballast of the boat as well as providing thermal control management along portions of the hull. In other embodiments, the fluid compartments 108 of the thermal signature control system 200 may be separate from and/or independent of any other fluid tanks of the boat 100. In some embodiments, the one or more fluid compartments may extend along at least a portion of the length of the boat 100 on the port side 214, the starboard side 216, or both. The fluid compartments 108 may thus be disposed between the heat sources 106 in the boat 100 and a portion of the hull 102, such that the fluid compartments 108 can absorb a portion of the heat energy 220 released from the heat sources 106 into the engine compartment 112 and transfer the absorbed heat energy 220 into a fluid 204 within the fluid compartments 108. For instance, a portion of the heat energy 220 from the heat sources 106 in the engine compartment 112 can be radiated into the inboard side of the fluid compartments 108 (e.g., to and through the inner wall(s) or bulkhead(s) 212) that run the length of the engine compartment 112. The radiated heat may be transferred to the fluid 204 through convection, conduction, and/or radiation. As the portion of the fluid 204 within the fluid compartment 108 that is closest to the heat source 106 moves within the fluid compartment 108, the heat absorbed by the portion of the fluid 204 near the heat source is distributed within the full volume of fluid in the fluid compartment 108, reducing the heat signature on the opposite outboard side of the fluid compartment 108 (e.g., the external wall 214, 216, which in the example in FIG. 2A are port and starboard portions of the hull).

The fluid compartment 108 may be fluid-tight to selectively contain the fluid 204 within the compartment. In some embodiments, the fluid compartment 108 may be a ballast tank and the fluid 204 may be ballast liquid such as water. In other embodiments, the fluid compartment 108 may be a fuel tank and the fluid may be fuel such as diesel, JP8, kerosene, or gasoline. In some embodiments, the fluid compartment 108 may be a tank that contains more than one type of liquid including a first type of liquid (e.g., water) and a second type of liquid (e.g., fuel), the two types of liquids segregated from one another by an internal barrier such as via a flexible bladder containing one of the two liquids within the ballast tank, and where both liquids in the tank function as ballast for the boat 100. In some embodiments, the fluid compartment 108 is defined between spaced-apart inner and outer hulls of the boat 100 extending along at least a portion of the length of the boat 100. The outer hull provides the outer surfaces of the boat which may come into contact with the water on which boat 100 floats, while the inner hull defines an interior hull cavity of the boat 100, e.g., one or more walls of the engine compartment 112 or other internal dry compartments of the boat 100.

In some embodiments, one or more heat exchangers may be operatively associated with the one or more heat source(s) 106 within the hull cavity (e.g., engine room or other compartment of the boat 100) to absorb heat energy from the heat sources 106. The one or more heat exchangers may include a liquid-liquid heat exchanger that contain and use a working fluid, such as a water/glycol mixture, to absorb and dissipate heat energy from the heat source(s) 106. The heat exchangers may have any suitable configuration such as configurations using coils, a shell and tube configuration, tube-fin, plate type, tube, mixing heat exchangers, or concentric or other suitable types or configurations. In some embodiments, a heat exchanger may be located between an inner and outer hull of the boat 100, where the inner hull defines a wall of the engine compartment 112 and the outer hull provides the outer surfaces that define the outer hull of the boat. In some embodiments, one or more heat exchangers may be provided between the heat source and the fluid compartment 108 such that heat energy rejected from the heat source is first transferred to the heat exchanger before being transferred, via the heat exchanger, to the fluid compartment 108. In some embodiments, heat rejected from the heat source 106 may be distributed over a larger area of the hull without the use of a fluid compartment 108 but using only a heat exchanger, such as a heat exchanger integrated into the cavity or the inner and outer hulls.

The working fluid of the heat exchanger can include refrigerants such as chlorofluorocarbons, hydrochlorofluorocarbons, hydrofluorocarbons, ammonia or other suitable refrigerants; glycol (e.g., propylene or ethylene glycol) based mixtures; water which may include seawater, or fresh water or other fluids. The working fluid may be selected based on temperatures at which the boat 100 operates. For example, a boat 100 operating in a cold environment like the arctic or Antarctic, may include a working fluid such as a glycol and water mixture with a low freezing point, below the freezing point of either fresh or seawater. In warmer environments, the working fluid may be seawater or air. In some embodiments, the working fluid may be a saturated vapor-liquid mixture, where the fluid exists both as a liquid and a vapor in various parts of the thermal signature control system. In some embodiments, the working fluid may be a supercritical fluid. The working fluid may be pressurized above ambient pressure, may be at ambient pressure, or may be held at a vacuum below ambient pressure.

In various embodiments, the working fluid may absorb or release the heat energy 220 as sensible heat (i.e., a change in heat energy in the working fluid results in a change in temperature of the working fluid); latent heat (i.e., a change in heat energy in the working fluid contributes to a phase change of the working fluid, or changes the quality of a saturated vapor-liquid mixture, but does not result in a change in temperature of the working fluid); or both sensible and latent heat.

Referring back to the example in FIG. 2A in which at least a portion of the heat energy is transmitted (e.g., via convection, conduction and/or radiation) through the inner wall of the fluid compartment to the fluid 204 within the fluid compartment, a pump 202 is operatively connected to the fluid compartments 108, e.g., via a conduit 210, to draw a portion (e.g., a first volume) of the fluid 204 from the fluid compartments 108 and route that portion (e.g., the first volume) of the fluid 204 to a heat exchanger 206. The heat exchanger 206 may be located in the hull cavity 112 of the boat 100, or in other suitable locations. As described herein, the heat exchanger 206 withdraws at least a portion of the heat energy 220 from the routed portion (e.g., the first volume) of the fluid 204. The heat energy 220 absorbed by the heat exchanger, and depending on the type of heat exchanger, may be temporarily stored as latent energy (or phase change energy) in the heat exchanger and may thus not result in detectable increase of temperature. In some embodiments, excess of the heat energy 220 absorbed by the heat exchanger, such any heat energy beyond energy that may be stored as latent heat, may be discharged from the boat 100 such as by any appropriate structure or apparatus of the heat exchanger or another heat exchanger, and/or it may optionally be exhausted from the heat exchanger at another location that may have a lesser impact on the detectable heat signature of the boat (e.g., on a hull portion located below the waterline). For example, the heat exchanger 206 may include an evaporator which may cause the liquid working fluid (a liquid refrigerant) to evaporate to absorb heat energy from the fluid 204. The working fluid may then discharge the heat energy, e.g., through a condenser or other heat exchanger positioned at a location that may have lesser impact on the heat signature of the boat 100. The fluid 204 from a fluid compartment 108 may be coupled, via the pump 202, to one of the two fluid passages of a heat exchanger 206, the second fluid passage containing a working fluid in thermal communication with the fluid 204 via the wall separating the two passages, but is fluidically isolated from the fluid 204, such that heat energy can be transferred from the fluid 204 to the working fluid of the heat exchanger.

Figure 2B:
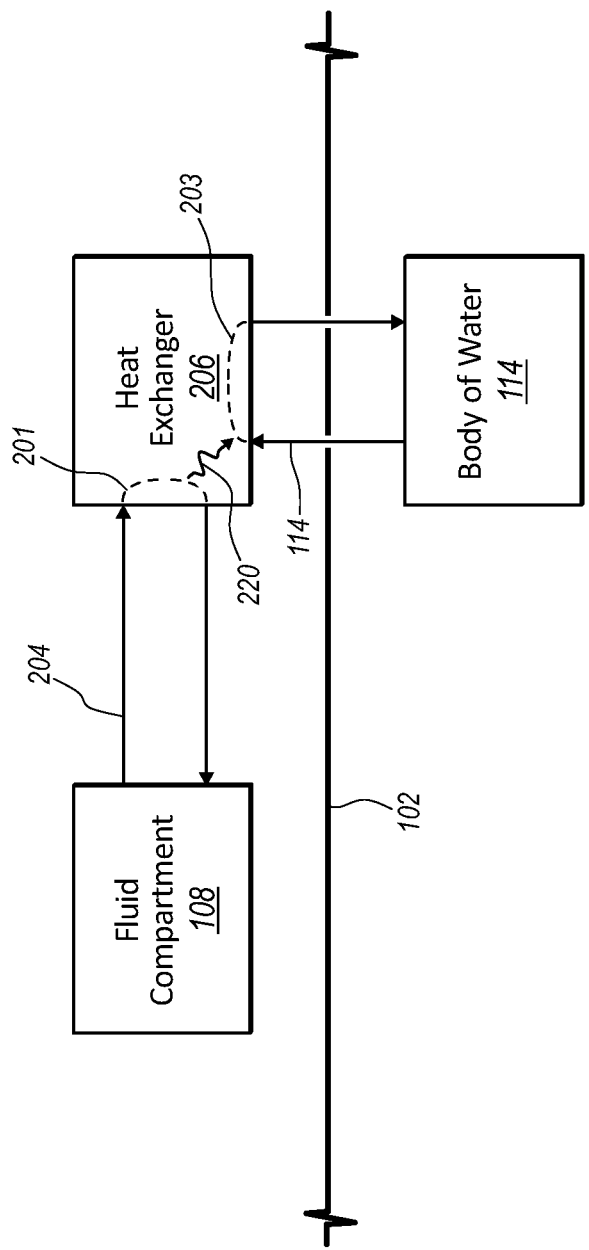
FIG. 2B illustrates a simplified block diagram of a heat exchanger according to one embodiment.

As shown schematically in FIG. 2B, the heat exchanger 206 may have two fluid circuits 201 and 203 that are in thermal communication with one another, but not in fluid communication with one another. Examples of such a type of heat exchanger include, but not exclusively, shell and tube, plate, tube-in-tube, microchannel, spiral, or other suitable types. A pump may be provided in one or both fluid circuits 201 and 203 to circulate fluid throughout. For example, the pump 202 may circulate ballast water or other fluids from a fluid compartment 108 to the heat exchanger 206 and back to the fluid compartment 108, or another fluid compartment. Likewise, a pump may be provided in the fluid circuit 203 to circulate a working fluid, to absorb heat from the fluid circuit 201. As shown in FIG. 2B, the working fluid is water 114 from the body of water in which the boat 100 floats. Other working fluids as disclosed herein may be used in other embodiments. In some embodiments the working fluid may be circulated through either or both of the fluid circuits 201, 203 by other suitable methods. For example, water 114 may be moved through the heat exchanger 206 by the relative motion of the boat 100 to the water 114, e.g., such as caused by propulsion of the boat 100 by a prime mover. As the fluid 204 flows through one fluid circuit, e.g., circuit 201, into the heat exchanger 206, heat energy 220 carried by that fluid 204 may be transferred to the fluid in the fluid circuit 203. The fluid flowing in the circuit 203 may absorb the heat energy 220 and carry it out of the boat 100. The fluid 204 flowing in circuit 201 may then be at a lower temperature than when it entered the heat exchanger 206.

At least a portion of the cooled fluid 204 (e.g., a second volume of fluid that has a different, lower temperature than the first volume) may be returned to the fluid compartments 108 via a discharge conduit 218. As used herein, "cooled" when describing the fluid 204 in the fluid compartment 108 may refer to a reduction of heat, generally sensible heat, but in other cases may be latent heat or a combination of latent and sensible heat. Likewise, "heated" when describing the fluid 204 in the fluid compartment 108 may refer to an increase of heat, generally sensible heat, although in some cases may be latent heat or a combination of latent and sensible heat. Thus, the heat or thermal signature of the hull 102 of the boat 100 may be controlled along any desired portion of the hull 102 of the boat 100.

While described above as extracting heat to reduce the heat signature along a portion of the hull, the thermal signature control system 200 may be operated in a mode in which the heat exchanger 206 adds heat energy to the portion of the fluid 204 in order to heat the fluid 204 and increase the temperature along a portion of the hull 102. Increasing the temperature of a portion of the fluid 204 may be used in applications where the boat is an icebreaker and heat is added to a fluid compartment 108 (e.g., a ballast tank) to prevent freezing. This operation mode may also be used fluid 204 temperatures are lower than surrounding air temperatures. In such a situation, filling a fluid compartment 108 with cold fluid 204 (e.g., ballast water or fuel) could make the boat 100 contrast thermally with the surroundings, increasing its thermal signature. Thus, adding heat to a fluid compartment 108 may bring the temperature of a thermally-controlled portion 116 closer to that of ambient conditions. It may be desirable to operate a thermal signature control system to create a confusing or variable heat signature to mask the size, shape, or other feature of the boat 100 from thermal sensors. It may be desirable to operate a thermal signature control system to move a thermal signature from one portion of the boat 100 to another portion.

Figure 3:
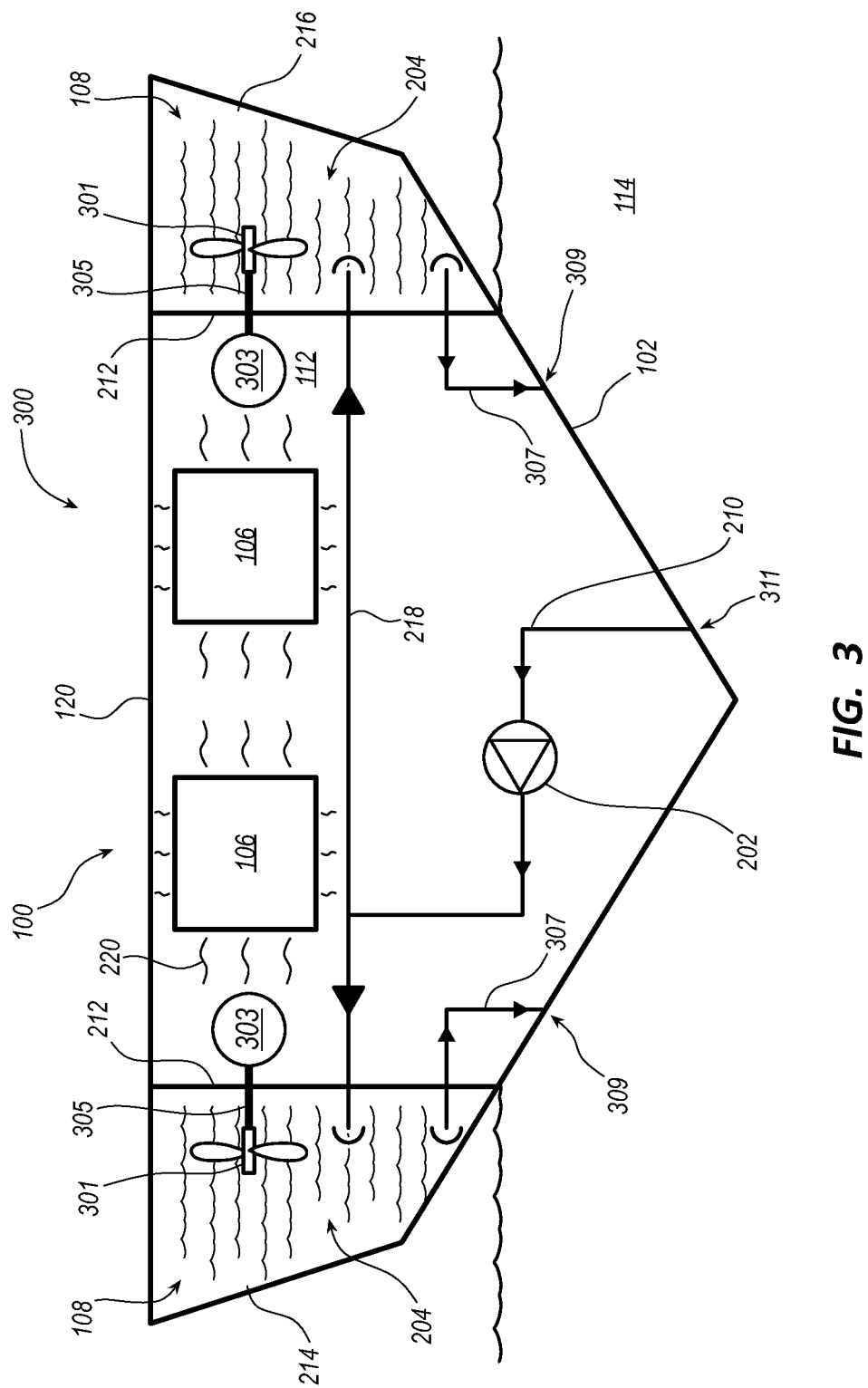
FIG. 3 illustrates a cross section of the boat of FIG. 1 with another embodiment of a thermal signature control system.

FIG. 3 shows a thermal signature control system 300 according to another example and which has one or more components similar to those of the thermal signature control system 200 in FIG. 2A. Like the example in FIG. 2A, the system 300 includes a pump 202 to move fluid within a fluid compartment 108. The thermal signature control system 300 includes a fluid mover 202 that draws a volume of fluid from the environment surrounding the boat 100 into a fluid compartment 108. As the fluid moves through the fluid compartment 108 it absorbs heat energy 220 from a heat source 106, becoming warmer. The fluid entering the fluid compartment 108 may cause warm fluid to flow from the fluid compartment 108 into the environment surrounding the boat 100, for example, through a conduit 307.

For example, in the system 300, water 114 is drawn into the boat 100 at an inlet 311. The inlet 311 can be located at any suitable location on the boat 100 that will enable the pump 202 to draw the water 114 into the boat 100. The water 114 is moved from the inlet 311 to the pump 202 via an inlet conduit 210. The water 114 is distributed by the pump 202 to starboard and port fluid compartments 108 via a discharge conduit 218. Thus, in this embodiment, the fluid 204 within the fluid compartments 108 may be substantially water 114 from the body of water in which the boat 100 floats. In various embodiments, the fluid compartments 108 can be located at any suitable location in the boat 100. As the water 114 travels through the pump circuit, including the inlet 311, the inlet conduit 210, the pump 202, the discharge conduit 218, and/or the fluid compartments 108, the water 114 may absorb heat energy 220 from a heat source 106. The water 114 or fluid 204 may be discharged out of the boat 100 by a fluid outlet 309 connected to a fluid compartment 108 by a fluid compartment discharge conduit 307. Although shown below the water line, the outlet 309 can be located at any suitable location on the boat 100 that will enable the water 114 or fluid 204 to leave the boat 100.

As shown in FIG. 3, any of the fluid compartments 108 may include an agitator 301, such as a mixer, paddle, pump, or stirrer that mixes the fluid within the fluid compartment 108. Such mixing may distribute fluid within the fluid compartment 108 to reduce or eliminate temperature gradients that could otherwise form as the fluid 204 within the fluid compartment absorbs heat energy. As shown in the example agitator 301 of FIG. 3, the agitator 301 has a form of a paddle turned by a motor 303 via a shaft 305. Although the motor 303 is shown outside the fluid compartment 108, in various embodiments, the motor could be located inside a fluid compartment 108, such as a submersible motor. The agitators 301 may be selectively activated to reduce temperature gradients in the respective fluid compartments in which they are located. Any of the embodiments of fluid compartments 108 in the present disclosure may include an agitator 301 and the associated motor 303, or shaft 305.

Figure 4:
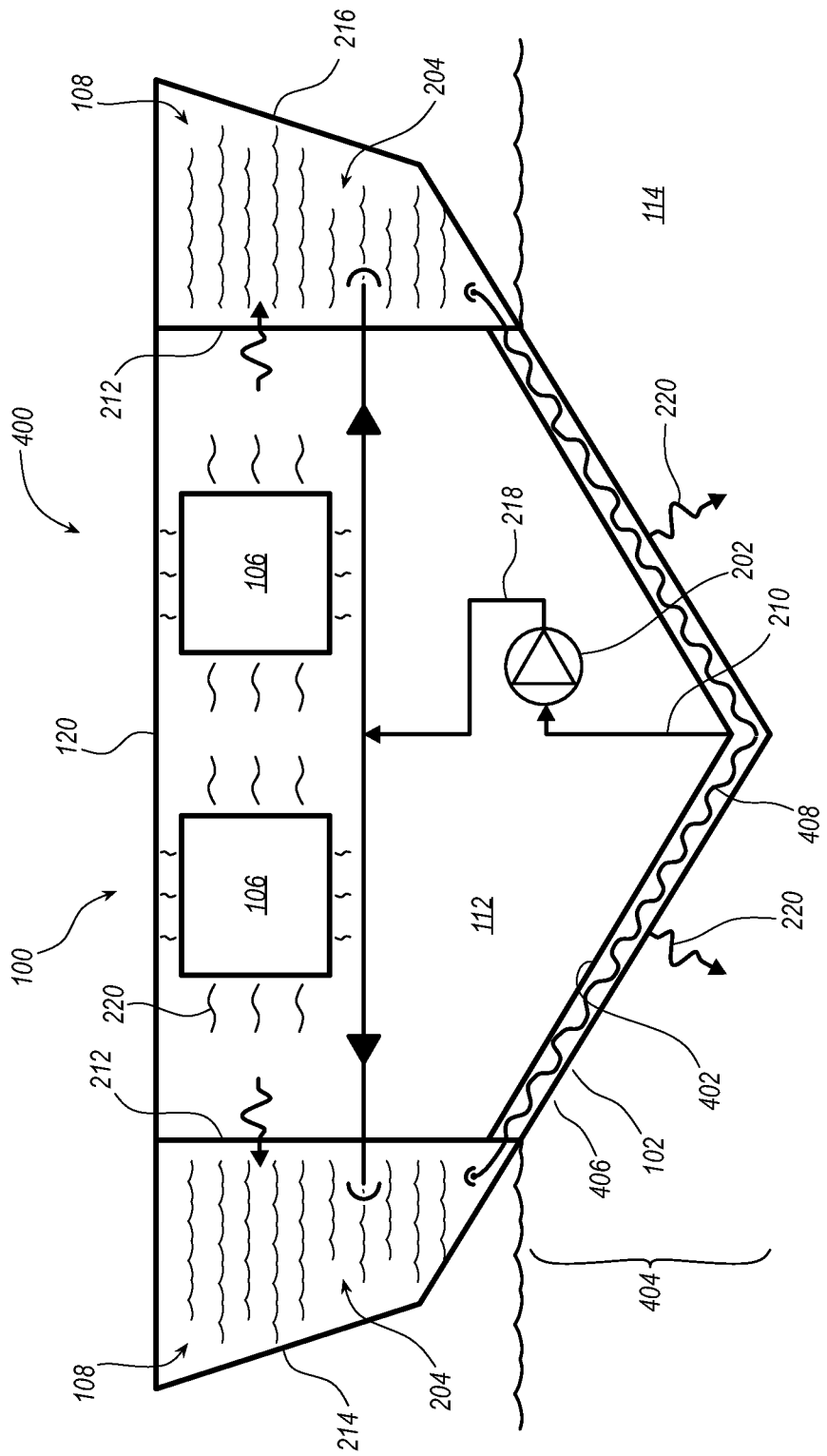
FIG. 4 illustrates a cross section of the boat of FIG. 1 with another embodiment of a thermal signature control system.

FIG. 4 shows a thermal signature control system 400 according to another example and which has one or more components similar to those of the thermal signature control system 200 in FIG. 2A. Like the example in FIG. 2A, in the thermal signature control system 400 of FIG. 4, heat energy 220 from a heat source 106 is transferred to the fluid 204 in fluid compartments 108 arranged between the heat source 106 and the outer hull 102. The fluid 204 may be moved within the fluid compartment 108 such as to distribute a heated portion or volume of the fluid 204 with other cooler portions of volumes of the fluid 204 in the fluid compartment 108. In some embodiments, the fluid 204 may be expelled (e.g., in the case of ballast water) and or consumed (e.g., in the case of fuel) by the boat, and in some case the consumed fluid 204 may be replaced with other fluid 204 (e.g., seawater) that may be taken in by a ballast tank in embodiments in which the fluid compartment 108 also functions as a ballast tank. The fluid 204 may additionally or alternatively be circulated through a heat exchanger circuit. For example, at least a portion (e.g., first volume) of the fluid 204 may be drawn by any suitable machine that can generate fluid flow (e.g., a pump 202) from the fluid compartments 108 and provided to a heat exchanger 408. In this embodiment, the heat exchanger 408 is disposed adjacent to, or formed integrally with, another portion of the hull 102 not occupied by the fluid compartment 108. For example, the heat exchanger 408 may be located or integrally formed within a cavity between the inner and outer hull portions that extend along the bottom (e.g., submerged) portion of the hull 102. The inner hull may at least partially define the hull cavity 112 of the boat 100. In some embodiments, the heat exchanger 408 may be adjacent and thermally coupled to, or integrally formed, with a portion of the hull 102 extending from the keel laterally, on one or both sides of the keel, for example, up to the design waterline, or to a location below the design waterline. In some embodiments, the boat 100 may be configured as a variable displacement craft, that operates in a high freeboard associated with a low design waterline, and a low freeboard mode, associated with a high design waterline. In some such embodiments, the heat exchanger 408 may be arranged to extend to a vertical location not higher that the low waterline such that the heat exchanger 408 always remains submerged in water during any operational condition of the boat. In some embodiments, the heat exchanger 408 may extend up to a chine line of the boat.

The heat exchanger 408 may include at least one fluid passage for receiving and passing the fluid 204 therethrough. The fluid passage may optionally include turbulators and/or plates to facilitate the transfer of heat from the fluid 204 to the heat exchanger 408. In some embodiments, the heat exchanger 408 may have two fluidically separate fluid passages and the fluid 204 may pass through one of the two passages, with a working fluid being contained in the other one of the two fluid passages of the heat exchanger 408. Regardless of whether one or more fluid passages are used, heat from the fluid 204 may be transferred to the heat exchanger 408 and optionally rejected to the water surrounding the outer hull portion to which the heat exchanger 408 is thermally coupled to or integrally formed with. As described, the placement or extents of the heat exchanger 408 may be selected based on the design draught 404 of the boat 100. For instance, the heat exchanger 408 may be configured to reject the heat energy 220 to a heat exchange surface 406 that may be wholly, partially, or substantially below the waterline, and ultimately reject heat energy 220 into the body of water 114 in which the boat 100 floats. In various embodiments, the heat exchanger 408 may be located in other parts of the boat, without restriction, such as the deck 120, on various starboard side 216 or port side 214 portions of the hull above or below the water line, in bow or stern portions of the boat 100, or other suitable locations. The heat exchange surface 406 may be a portion of the hull 102. The heat exchange surface 406 may have a surface area larger than that of the engine room 112. Such an arrangement may allow for the heat energy 220 to be dissipated at a lower temperature than that of the engine room 112, thus decreasing the thermal signature of the boat. The cooled fluid 204 may be returned from the heat exchanger 408 to the fluid compartment 108 via one or more conduits and fluid movers (e.g., one or more pumps). For example, the cooled fluid 204 that exits the heat exchanger 408 may be coupled by a first conduit 210 to the pump 202 and from the pump 202 to the fluid compartments 108 via a discharge conduit 218 completing a heat exchange circuit that may enable the continuous or periodic circulation of fluid 204 through the heat exchanger 408 to withdraw heat energy 220 released by the heat sources 106 and absorbed by the fluid 204 in fluid compartment 108.

In another embodiment of a thermal signature control system similar to that of FIG. 4, a heat exchanger, such as a liquid to liquid heat exchanger, may be thermally coupled to or integrated into the bulkheads 212 such that at least some of the heat energy 220 rejected toward the fluid compartment 108 is absorbed by the heat exchanger, and more specifically by a working fluid of such heat exchanger, which is between the heat source 106 and the fluid compartment 108, and which is then coupled into the heat exchanger 408 to be dissipated to the water surrounding the hull 102, as previously described. In some such embodiments, the heat exchanger 408 may include multiple cooling loops, one to receive the heated working fluid from the heat exchanger at the lateral bulkheads 212 and optionally another to receive heated fluid 204 from the fluid compartment 108.

Using a dense fluid like water from the body of water 114 on one side of the heat exchanger 408 may enable the heat exchanger 408 to be more compact than an air-based heat exchanger. The heat capacity of water and the amount of water relative to the size of the boat 100 may result in small or negligible changes in water temperature due to the released heat energy 220, thus making the release of heat energy 220 difficult to detect, reducing the thermal signature of the boat 100.

Figure 5:
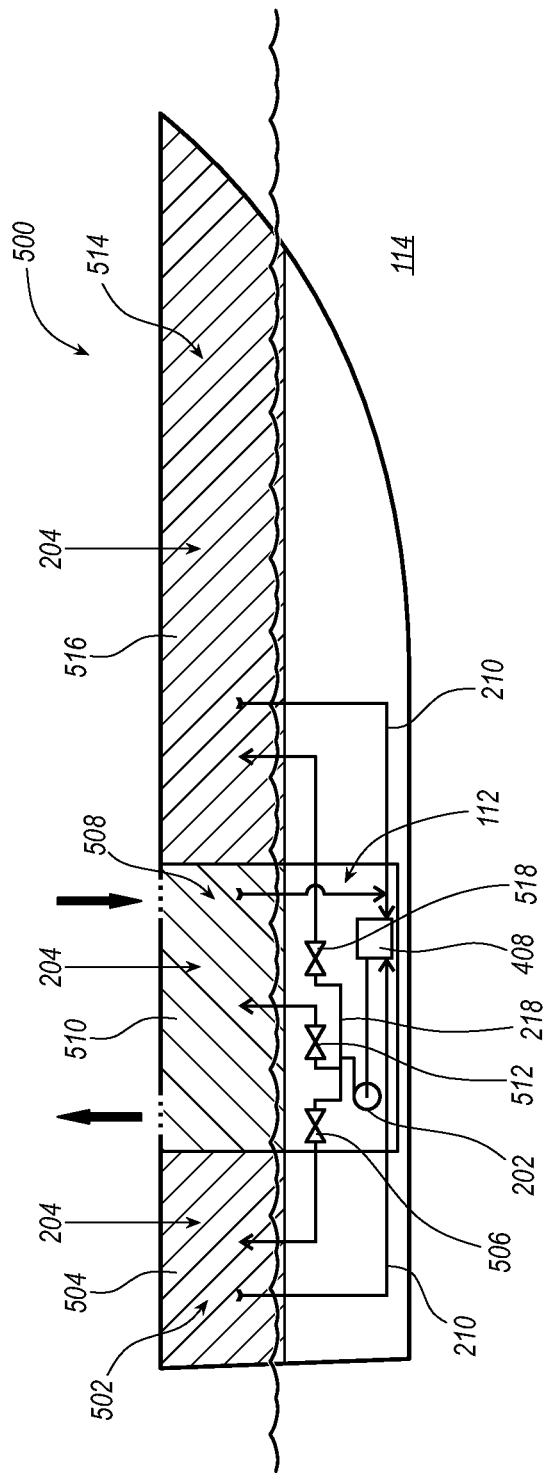
FIG. 5 illustrates a thermal signature control system in accordance with one embodiment.

Any of the embodiments of thermal signature control systems disclosed may include multiple thermally-controlled portions, such as plates, in the hull 102 at localized areas that have controllable heat transfer or other thermal properties compared to the general hull 102, and compared to each other. For example, as shown in FIG. 5, a thermal signature control system 500 has multiple, addressable thermally-controlled portions 504, 510, and 516. The thermal signature control system 500 may include elements in common with the thermal signature control systems 200, 300, and/or 400, description of which would be redundant and is omitted.

As with the thermal signature control systems 200 and 400, the thermal signature control system 500 includes a pump 202, and a heat exchanger 408. The discharge conduit 218 distributes the fluid 204 to a set of valves 506, 512, and 518, which may be opened or closed to start, stop, or control the flow of the fluid 204 to the various fluid compartments 502, 508, or 514 associated with the thermally-controlled portions 504, 510, and 516, respectively. The thermal signature control system 500 can thus individually or collectively control the temperature or thermal characteristics of the thermally-controlled portions 504, 510, and 516. Such embodiments may have the technical advantage of allowing the thermal signature of a boat 100 to blend into its surroundings with a fine level of detail and specificity, essentially making the boat 100 into a chameleon with the same or similar thermal signature as the environment.

For example, the fluid compartment 508 and thermally-controlled portion 510 may be located longitudinally at the same location as the engine compartment 112 and thus may be subjected to heat energy from various heat sources 106. In one mode of operation, the thermal signature control system 500 may direct relatively more fluid 204 to the fluid compartment 508 to reduce the thermal signature of the thermally-controlled portion 510 more relative to the thermally-controlled portion 504 and thermally-controlled portion 516, which may be subjected to lower heat loadings. In another mode of operation, the thermal signature control system 500 may distribute heat from the fluid compartment 508 to the fluid compartment 502 or the fluid compartment 514. Although FIG. 5 shows the thermally-controlled portions 504, 510, and 516 on one side of the boat 100, various thermally-controlled portions may be located at any part of the hull 102 of the boat 100.

Figure 6:
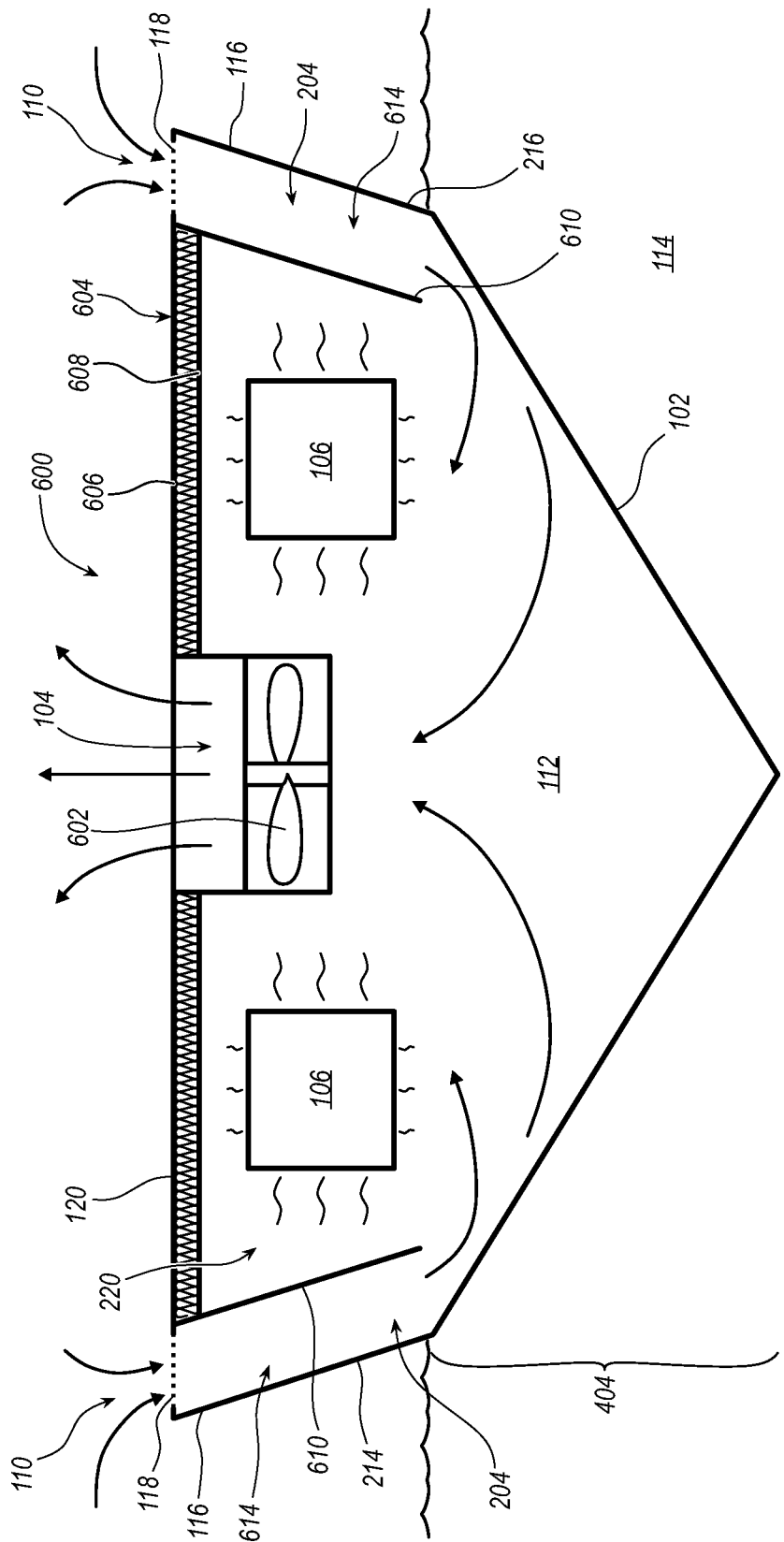
FIG. 6 illustrates a cross section of the boat of FIG. 1 with another embodiment of a thermal signature control system.

FIG. 6 illustrates an embodiment of a thermal signature control system 600. The boat 100 includes various heat sources 106 located within the engine compartment 112, as in other embodiments disclosed. The thermal signature control system 600 includes a fluid mover 602 that draws a volume of fluid from the environment surrounding the boat 100 into a fluid compartment 614 and then into the engine compartment 112. As the fluid moves through the fluid compartment 614 and the engine compartment 112, it absorbs heat energy 220 from a heat source 106, becoming warmer. The fluid mover discharges the warm fluid from the engine compartment 112 into the environment surrounding the boat 100. For example, the engine compartment 112 receives a fluid 204, such as air, from an air intake 110. Air is drawn through the engine compartment 112 by an air mover 602, and exhausted through an air exhaust 104. In some embodiments, the air may have a spray or mist of water or other liquid added to it to enhance its thermal properties. The air passes through a fluid compartment such as an air intake plenum 614 defined by the inner surface of the hull 102 and a baffle 610 located inward from the hull 102 in the engine compartment 112. The baffle 610 may define a wall of the engine compartment 112. The air intake plenum 614 may be in fluid communication with the engine compartment 112. In the embodiment shown, two air intakes 110 and baffles 610 are included, although there may be more or fewer air intakes 110 and/or baffles 610 included.

Any of the embodiments of thermal signature control systems disclosed here may include insulation 604 in various locations of the hull 102, baffles, or deck 120 of the boat 100 to further control the thermal signature of the boat 100. For example, as shown in FIG. 6, insulation 604 may be disposed between an upper surface 606, and a lower surface 608 of the deck 120. The deck 120 and/or other portions of the boat 100 may be insulated with thermal insulation 604 to reduce heat flux between the engine compartment 112 and the environment at insulated locations. In various embodiments, the thermal insulation 604 may be a conductive or convective insulator, and/or a radiant heat barrier. The thermal insulation 604 may be a fibrous insulator (e.g., glass, ceramic, or cellulose fibers); it may be a cellular insulator (e.g., foam); or it may be an aerogel. In some embodiments, the thermal insulation may include a trapped pocket of air or other gas. In some embodiments, the thermal insulation 604 may be an at least partial vacuum. Such a vacuum could be initiated and maintained by a vacuum pump aboard the boat 100. The thermal insulation 604 may be any suitable combination of the above types of insulation.

In the embodiment of FIG. 6, heat energy 220 from the heat sources 106 is transferred through the engine compartment 112, primarily by convection and radiation to the baffles 610. The heat energy 220 transfers through the baffles 610, primarily by conduction. The heat energy 220 is then transferred to the fluid 204, in this case air, primarily by convection and radiation and is absorbed by the fluid 204. The heated fluid 204 may then be swept into the engine compartment 112, thereby preventing, or reducing the amount of, the heat energy 220 that reaches the thermally controlled portion 116 of the hull 102, thus controlling the temperature of the hull 102.

As shown in FIG. 6, the baffles 610 may be selected based on the draught 404 of the boat 100. In FIG. 6, the baffles 610 extend vertically to approximately the waterline on the boat 100. In other embodiments, the baffles 610 may extend below the waterline on the boat 100. In other embodiments, the baffles may terminate above the waterline.

Figure 7:
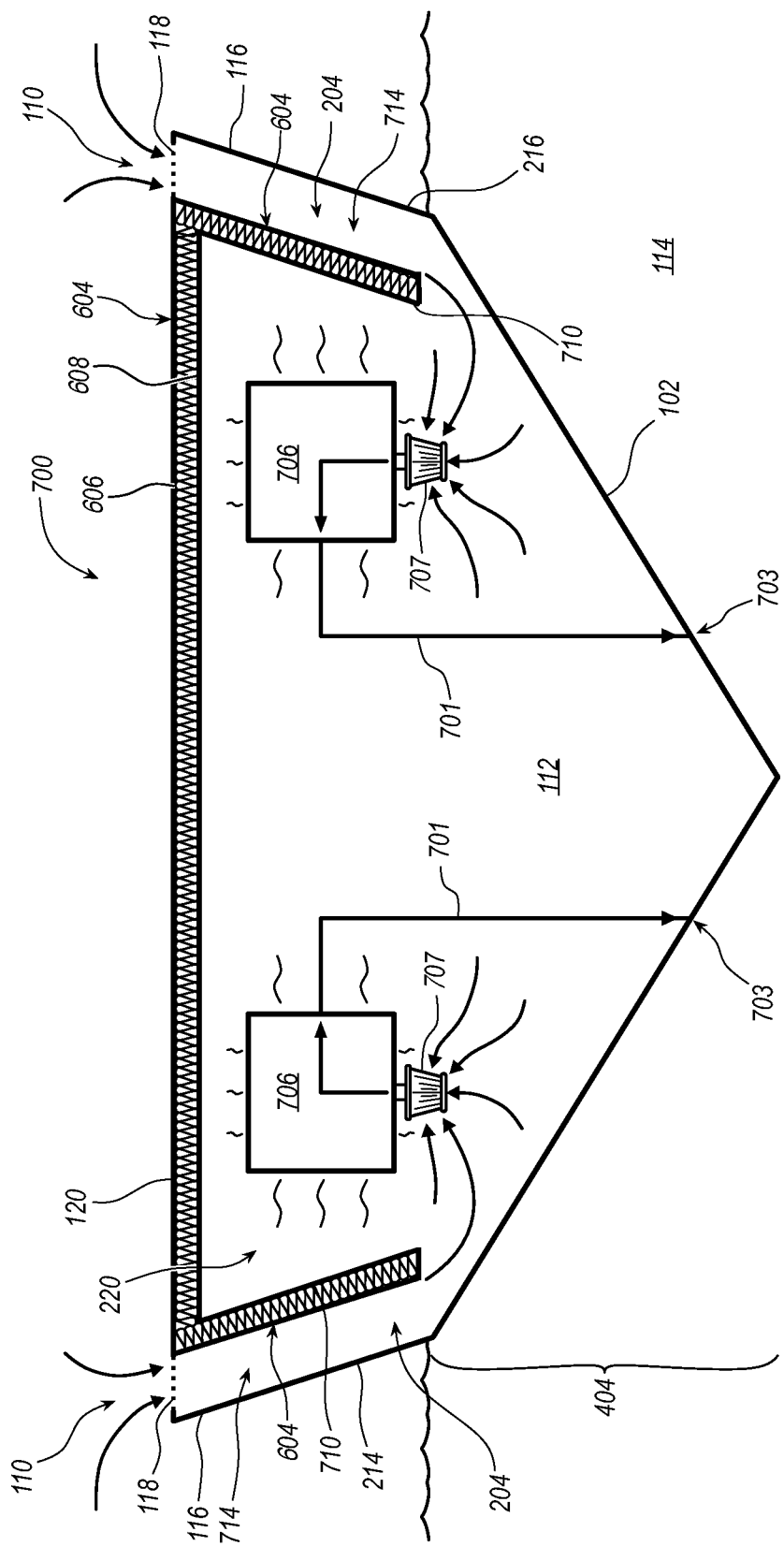
FIG. 7 illustrates a cross section of the boat of FIG. 1 with another embodiment of a thermal signature control system.

FIG. 7 shows a thermal signature control system 700 according to another example and which has one or more components similar to those of the thermal signature control system 600 in FIG. 6. In the thermal signature control system 700, fluid such as air, drawn in to the engine compartment 112, such as via an air intake 110 can be drawn in to an engine 706. In such an embodiment, an engine 706 may be a fluid mover that moves air via the operation of its combustion process, such as a reciprocating piston engine drawing an intake manifold vacuum. The air may pass through a filter 707 before being drawn in to the engine 706. Such air may be used as combustion air to support power output of the engine 706. As in the thermal signature control system 600, the air may absorb heat energy 220 released by the engine 706 as the air passes through the fluid compartment 514. After combustion, the air may be discharged with other exhaust constituents (e.g., water, carbon monoxide, carbon dioxide, unburned fuel, and other similar products of a combustion reaction) out of the boat 100 via an engine exhaust 703. The engine exhaust 703 may be connected to the engine via an exhaust conduit 701. Preferably the engine exhaust 703 is located below the waterline, but may be located in any suitable position on the boat.

Figure 8:
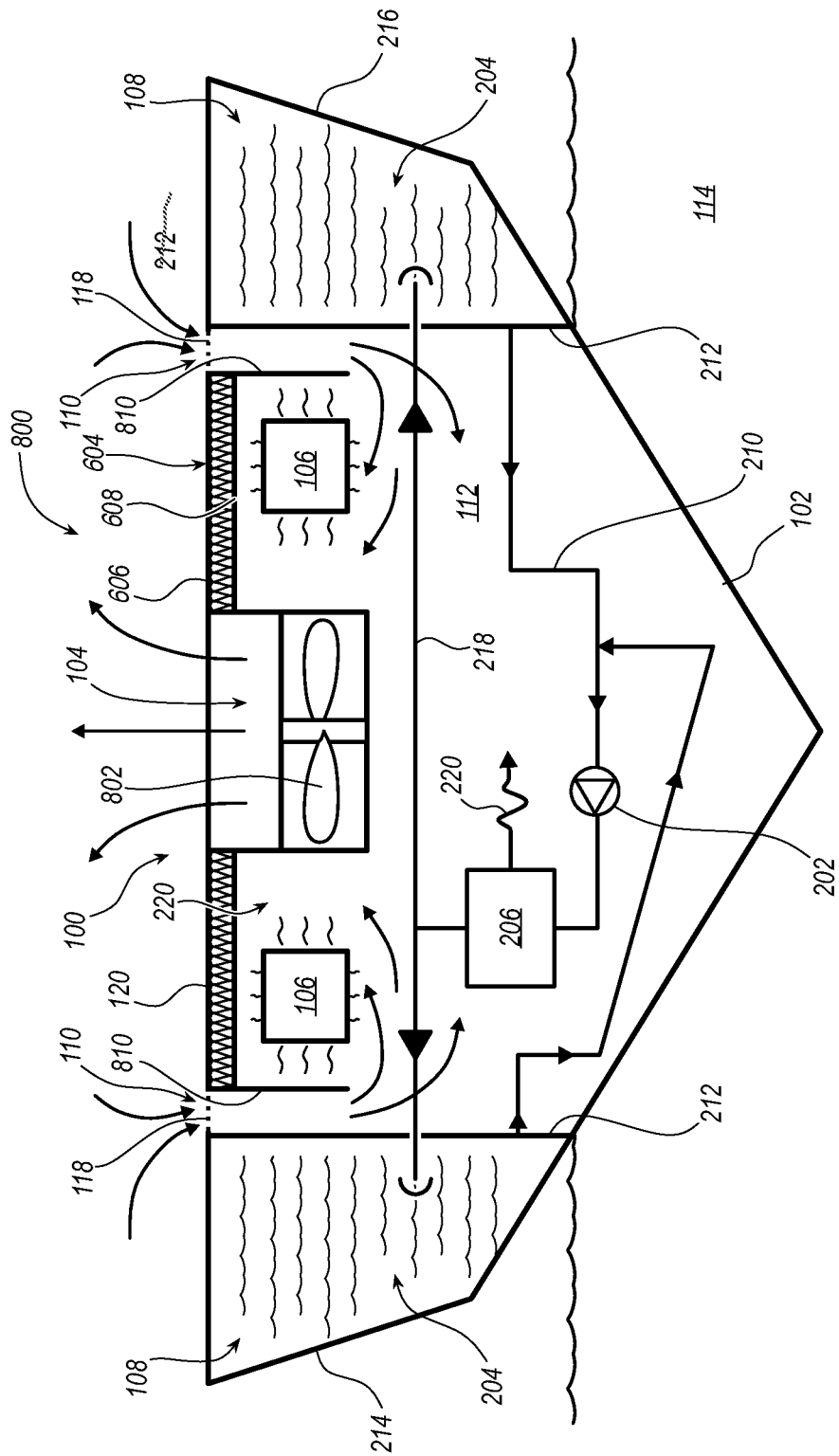
FIG. 8 illustrates a cross section of the boat of FIG. 1 with another embodiment of a thermal signature control system.

FIG. 8 shows a thermal signature control system 800 that includes one or more components similar to those of the thermal signature control systems 200 and 600. In the system 800, air may be drawn into the engine compartment 112 via the air intakes 110 either or both by an air mover 802 or by a heat source 106 such as an engine, for example as described with respect to the system 700, above. The air may travel through a plenum defined between a baffle 810 and a bulkhead 212. The system 800 may also include a pump 202 and heat exchanger 206 to circulate a fluid 204 through a fluid compartment 108, as described with respect to the system 200. The system 800 may reject absorbed heat 220 through a heat exchanger 206 as previously described.

Any of the thermal signature control systems disclosed herein may include insulation on an internal wall of bulkhead of the boat. See, for example, the insulation 604 included in the baffles 710 of the thermal management control system 700. Such insulation may impede heat flow from the hull cavity 112 to an outer skin of the boat 100, thereby controlling the thermal signature of the boat 100.

Any of the embodiments of thermal signature control systems disclosed herein may include a temperature control system or mechanism, such as a thermostat or electronic temperature control so that the temperatures of certain areas of the boat 100 can be regulated to desired set points. A simple mechanical thermostat may be used, such as a thermostat including a bi-metallic strip that bends in response to temperature changes.

More complex temperature control systems may additionally or alternately be used, for instance a system including a processor executing a control algorithm such as a proportional, integral, derivative (PID) control loop that senses a process variable, such as a temperature, and controls a control output, such as a pump speed, to control a process variable to a set point. For instance, the temperature control mechanism can control the temperature of the fluid 204 in the fluid compartments 108 to set points in certain temperature ranges such as between about 0° C. and 60° C. In some embodiments, the temperature control system can control a set point such as a skin or surface temperature of the hull 102 by controlling the speed of the pump 202, or other process variables.

Figure 9:
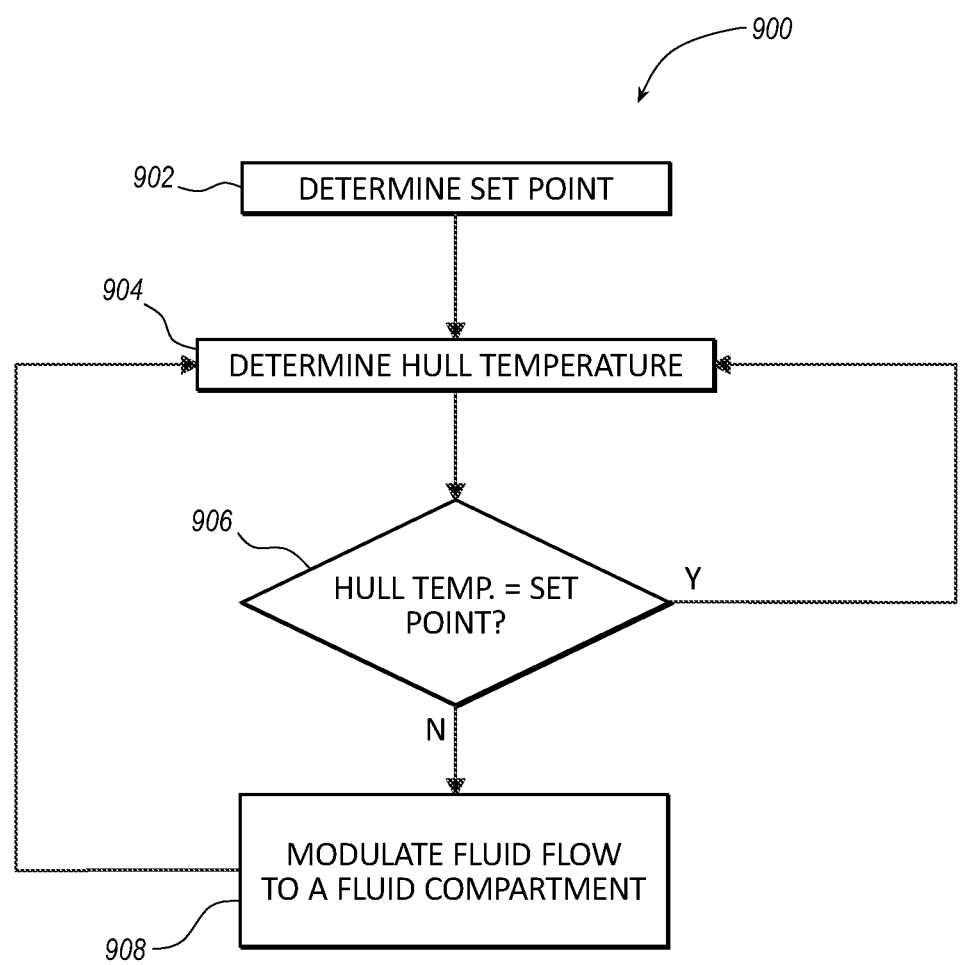
FIG. 9 illustrates a method of controlling a thermal signature of a boat.

FIG. 9 illustrates a method 900 of controlling the thermal signature of a boat 100. The method 900 may begin in operation 902 and a processing element may determine a temperature set point for a portion of the hull 102. The set point may be determined by an algorithm that considers variables such as the time of day, mission, weather conditions, ambient air or water temperatures, boat 100 speed, wind speed, heading, insolation, or a combination of these and other suitable factors. The set point may be set or adjusted by a crew person. The order of the operations in method 900 are shown in a particular order for clarity. The various operations of method 900 can be executed in other orders than shown, and can be executed in parallel.

The method 900 may proceed to operation 904 and the processing element determines the temperature of a portion of the hull 102, for example, a thermally-controlled portion 116. The hull temperature may be determined by any suitable temperature sensor, such as a thermistor, a resistance temperature device, a thermocouple, or a thermal camera. The hull temperature may be determined by a sensor that is not on the boat 100, but is on another nearby vessel, buoy, or even a satellite, such as the case with a thermal camera or sensor.

The method 900 may proceed to operation 906 and the processing element may compare the set point to the temperature of the portion of the hull to determine an error therebetween. If the hull temperature is equal to the set point within a deadband, the method may return to operation 904 and continue monitoring hull temperature. The deadband may be selected or varied depending on parameters of a mission of the boat 100, such as the ambient temperature conditions, precipitation, the amount of thermal signature reduction desired, the accuracy or sensitivity of detectors or weapons systems that may be used to detect the boat 100, or the like. In various embodiments, the deadband may be +/−<0.5°, +/−1°, +/−2° C., +/−5° C., +/−10° C., or +/−20° C.

If, in operation 906, the hull temperature is greater or less than the set point by an amount more than the deadband, the method 900 may proceed to operation 908 where a thermal signature control system controls (i.e., increases or decreases) the flow of a fluid 204 to a fluid compartment, for instance a fluid compartment adjacent to a thermally-controlled portion 116. Additionally or alternately, the thermal signature control system may control the flow of a working fluid through a heat exchanger. The method 900 may include PID control algorithms to modulate the flow of fluid to the fluid compartment. The operation may then return to operation 904 and continue monitoring hull temperature.

Any of the embodiments disclosed can be configured to control the thermal signature of an external wall of a boat. The external wall may be a hull, as in the examples given, and can also be portion of a deck or other part of a boat. Fluid compartments, agitators, heat exchangers, heat sources, valves, air movers, pumps and other components of the thermal signature control systems disclosed herein may be arranged in any suitable manner and in any suitable location in the boat 100.

Various examples of the present disclosure have been described in detail above to facilitate an understanding of the invention. It will be recognized by those skilled in the art that many variations to the examples described are possible without departing from the scope and spirit of the invention disclosed herein, and that the scope of the claimed invention is defined by the claims listed below. The terms "including" and "having" as used in the specification and claims shall have the same meaning as the term "comprising."

What is claimed is:

1. A system for controlling a thermal signature of a boat, the system comprising:
    a boat having an external wall;
    a fluid compartment adjacent to the external wall of the boat, wherein the fluid compartment is disposed between a heat source in a hull cavity of the boat and the external wall of the boat such that heat energy released from the heat source is transferred to a fluid in the fluid compartment, wherein a waterline of the boat is configured to be substantially at or below a lower end of the fluid compartment; and
    a pump that moves a first volume of the fluid out of the fluid compartment and replaces at least a portion of the first volume of the fluid with a second volume of fluid, wherein the second volume of fluid has a different temperature than the first volume of the fluid before entering the fluid compartment.

2. The system of claim 1, wherein the fluid in the fluid compartment is a liquid, and wherein the fluid compartment is liquid-tight for selectively containing and flowing the liquid within and out of the fluid compartment.

3. The system of claim 2, wherein the fluid compartment is a ballast tank and wherein the fluid additionally serves as ballast fluid.

4. The system of claim 2, wherein the fluid compartment is a fuel tank and wherein the fluid is fuel.

5. The system of claim 1, further comprising an agitator disposed within the fluid compartment and operable to mix the fluid to reduce a temperature gradient in the fluid.

6. The system of claim 1, wherein the fluid compartment includes an internal barrier separating the fluid from a second fluid.

7. The system of claim 1, wherein the fluid compartment is defined between the external wall and a spaced-apart inner hull of the boat, the external wall and the inner hull extending along at least a portion of a length of the boat, the inner hull defining the hull cavity of the boat.

8. The system of claim 1, further comprising a heat exchanger, wherein the pump couples the first volume of the fluid to the heat exchanger, such that at least a portion of the heat energy of the first volume of the fluid is transferred to a working fluid of the heat exchanger to cool the first volume of the fluid before returning the cooled first volume of the fluid as the second volume of fluid to the fluid compartment.

9. The system of claim 8, wherein the heat exchanger is disposed adjacent to, or formed integrally with, the external wall.

10. The system of claim 8, wherein the heat exchanger is located between the external wall and an inner hull of the boat, the inner hull defining the hull cavity of the boat.

11. The system of claim 10, wherein a substantial portion of a surface of the heat exchanger is below a waterline of the boat.

12. The system of claim 1, wherein the fluid compartment is one of a plurality of fluid compartments including a first fluid compartment located between the heat source and a first external side of the boat, the plurality of fluid compartments further comprising a second fluid compartment adjacent to a second external side of the boat opposite the first side, and
    wherein the pump is configured to move fluid from either the first fluid compartment or the second fluid compartment out of the respective fluid compartment for replacing the fluid removed from the respective fluid compartment with cooler fluid.

13. The system of claim 12, further comprising a heat exchanger in fluid communication with the first and second fluid compartments, wherein the first and second fluid compartments are coupled to the heat exchanger via at least one conduit and wherein the pump generates a fluid flow through the at least one conduit.

14. The system of claim 12, wherein the first fluid compartment is located on a starboard side of the boat, and the second fluid compartment is located on a port side of the boat.

15. The system of claim 12, wherein one of the first fluid compartment or the second fluid compartment is located fore of the other of the first fluid compartment or the second fluid compartment.

16. The system of claim 1, wherein the fluid comprises a refrigerant, a mixture of glycol, or water.

17. The system of claim 1, wherein:
the fluid comprises air;
the fluid compartment is defined by a baffle;
the fluid compartment is in fluid communication with the hull cavity; and
the pump discharges the air from the boat.

18. The system of claim 1, wherein a portion of the external wall is insulated.

19. The system of claim 1, wherein the external wall is a hull.

20. A system for controlling a thermal signature of a boat, the system comprising:
a first fluid compartment adjacent to a first portion of an external wall of the boat and configured to store a fluid;
a heat source disposed within a hull cavity of the boat and configured to reject heat into the hull cavity, wherein the first fluid compartment is disposed between the heat source and the external wall of the boat;
a first pump configured to remove a first volume of the fluid from the first fluid compartment and to replace the first volume of the fluid with a second volume of fluid at a lower temperature than a temperature of the first volume of the fluid such that a thermal signature of the external wall is controlled; and
a second fluid compartment between the first fluid compartment and the heat source and defined by a baffle, wherein the second fluid compartment is configured to flow a gas through the second fluid compartment.

21. The system of claim 20, wherein the first pump discharges the first volume of the fluid into an environment surrounding the boat and draws the second volume of fluid into the boat from the environment.

22. The system of claim 20, wherein:
the fluid is a liquid;
the first pump is configured to move the liquid;
the first fluid compartment is configured to hold the liquid with a liquid-tight seal, the system further comprising:
a second pump configured to remove a first volume of the gas from the hull cavity and replace the first volume of the gas with a second volume of gas drawn into the hull cavity via the second fluid compartment, wherein the second volume of gas is at a lower temperature than a temperature of the first volume of the gas.

* * * * *